Figure 3:
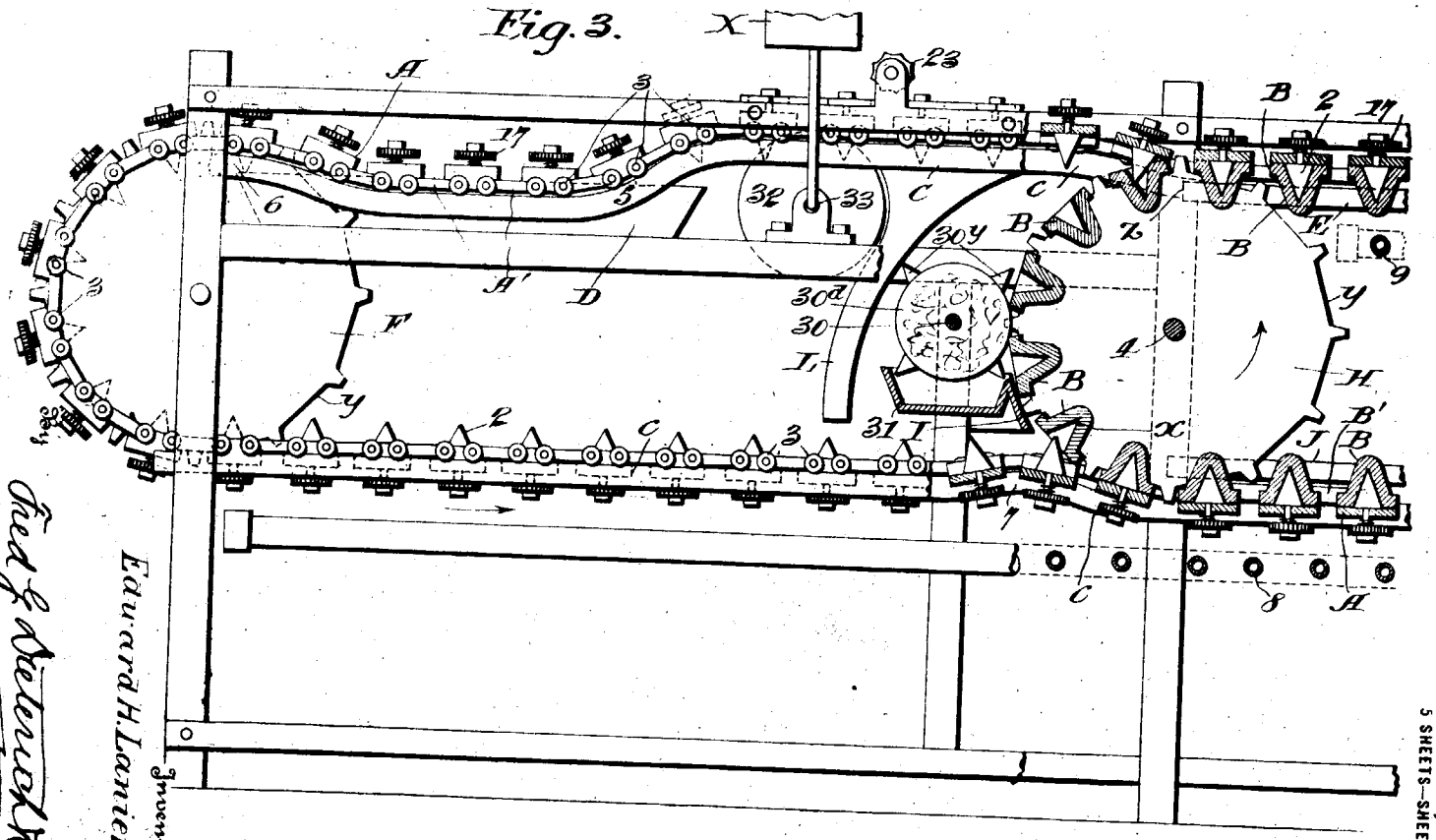

E. H. LANIER.
PASTRY MAKING APPARATUS.
APPLICATION FILED SEPT. 30, 1918
Reissued May 20, 1919.
14,651.
5 SHEETS—SHEET 1.
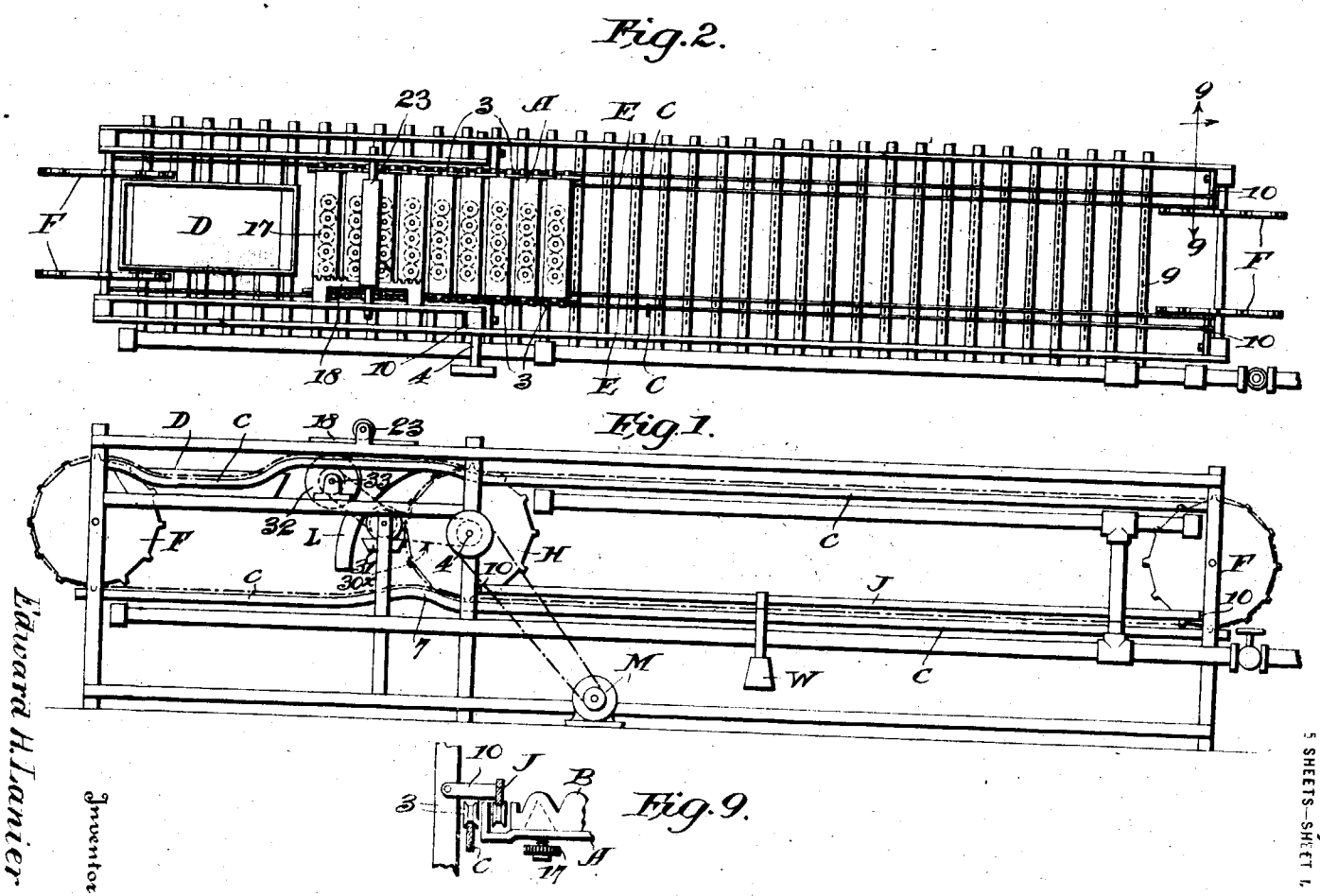
Inventor
Edward H. Lanier
By Fred G. Dieterich
Attorney

E. H. LANIER.

PASTRY MAKING APPARATUS.

APPLICATION FILED SEPT. 30, 1918

Reissued May 20, 1919.

14,651.

5 SHEETS—SHEET 2.

Inventor

Edward H. Lanier

By

Fred G. Dieterich & Co

Attorneys

E. H. LANIER.
PASTRY MAKING APPARATUS.
APPLICATION FILED SEPT. 30, 1918.
Reissued May 20, 1919.
14,651.
5 SHEETS—SHEET 3.
Fig. 4.
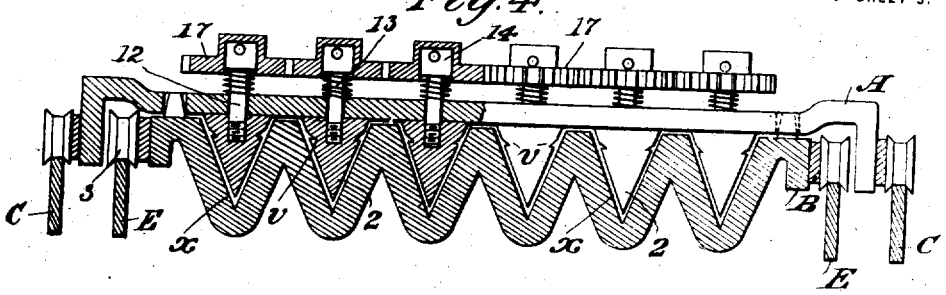
Fig. 5.
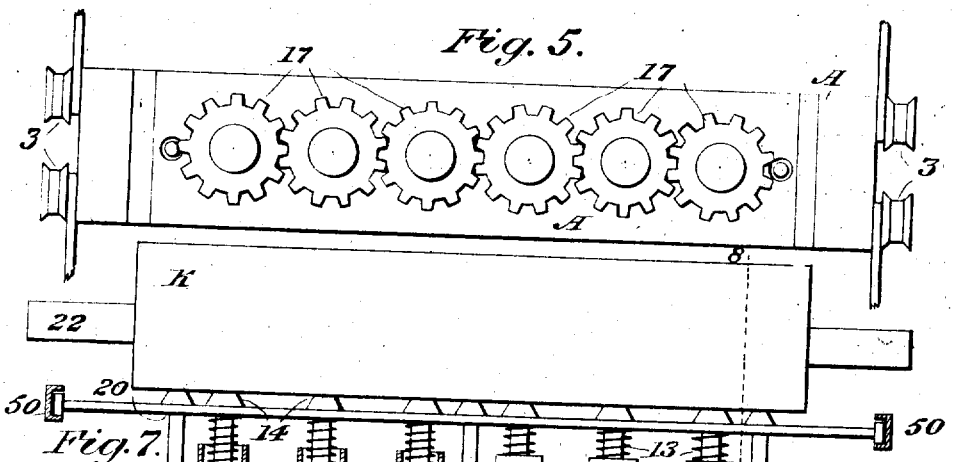
Fig. 7.
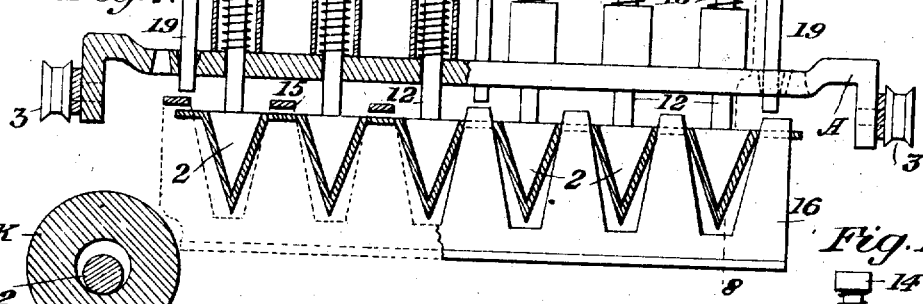
Fig. 10.
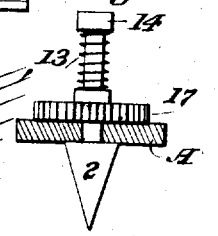
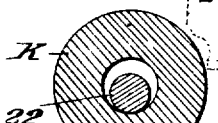
Fig. 8.
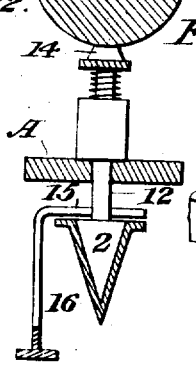
Fig. 6.
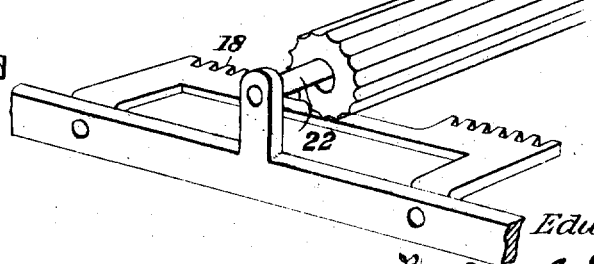
Inventor
Edward H. Lanier
By Fred G. Dieterich & Co
Attorneys E. H. LANIER.
PASTRY MAKING APPARATUS.
APPLICATION FILED SEPT. 30, 1918.
Reissued May 20, 1919.
14,651.
5 SHEETS—SHEET 4.
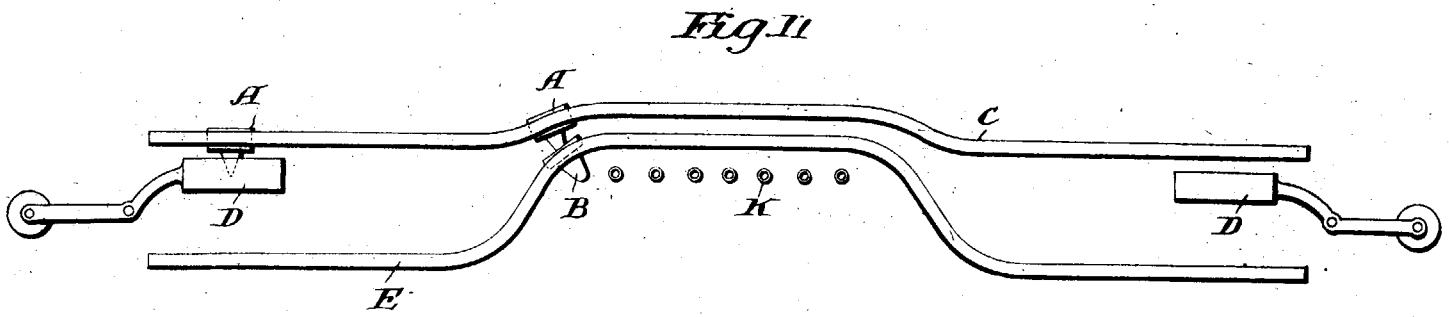
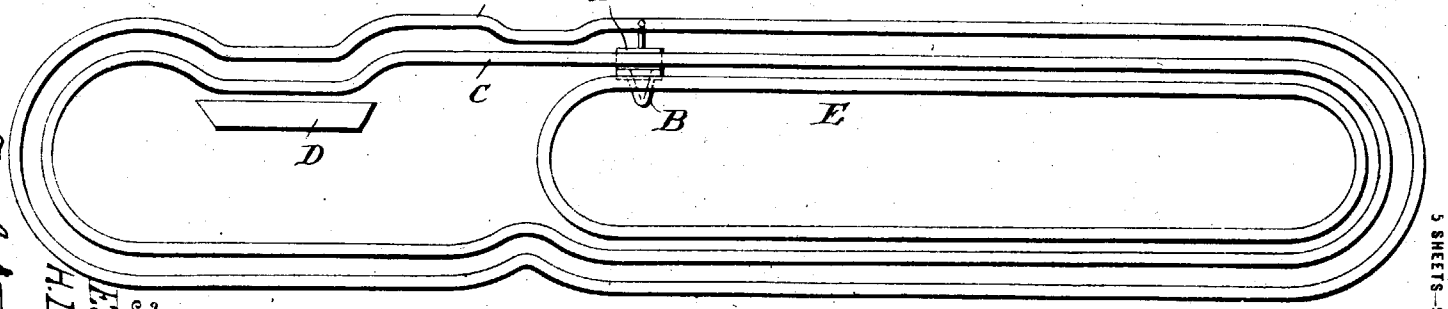
Inventor
Edward
H. Lanier
By Fred G. Dieterich Co
Attorneys.

E. H. LANIER.
PASTRY MAKING APPARATUS.
APPLICATION FILED SEPT. 30, 1918.
Reissued May 20, 1919.
14,651.
5 SHEETS—SHEET 5.
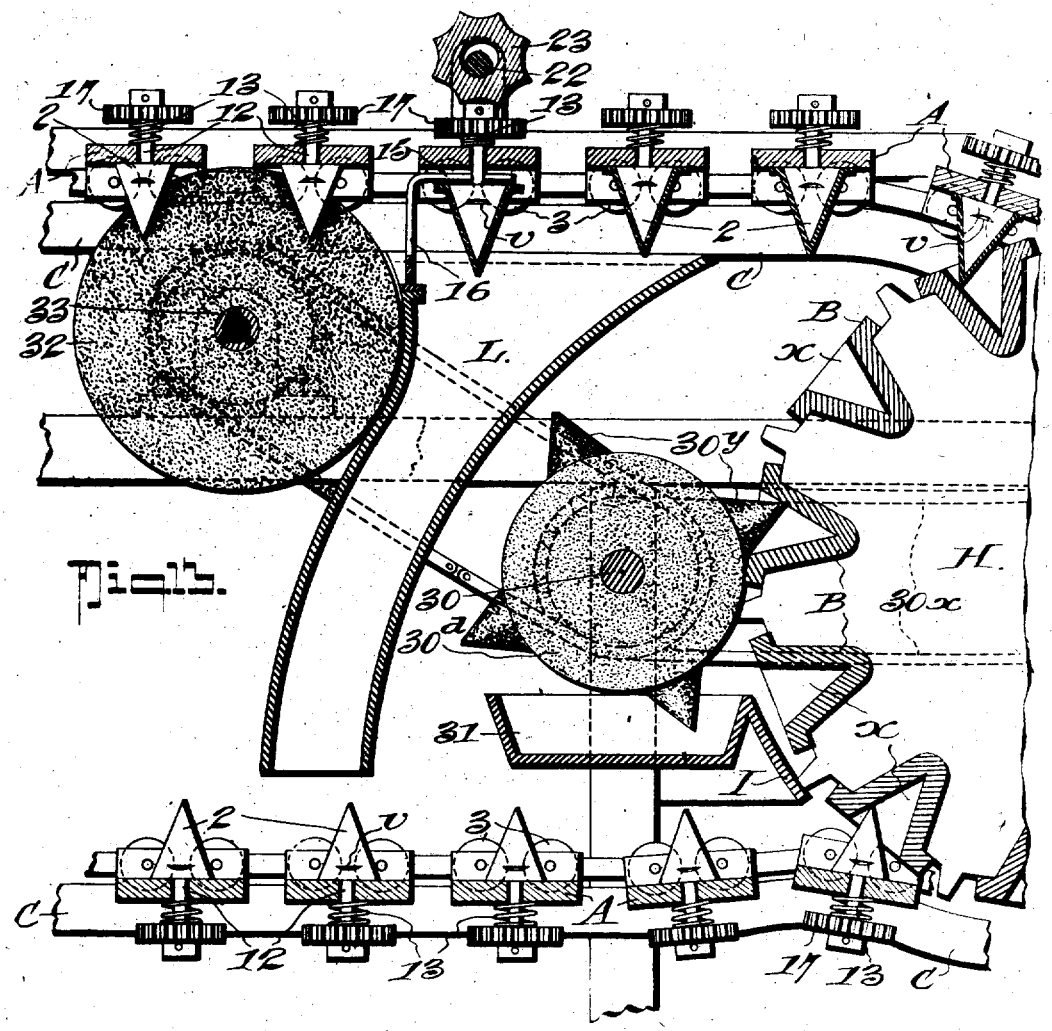
INVENTOR
Edward H. Lanier
BY
Fred G. Dieterich Co.
ATTORNEYS

UNITED STATES PATENT OFFICE.

EDWARD H. LANIER, OF CINCINNATI, OHIO.

PASTRY-MAKING APPARATUS.

Specification of Reissued Letters Patent. Reissued May 20, 1919.

14,651.

Original No. 1,257,497, dated February 26, 1918, Serial No. 466,868, filed December 10, 1908. Application for reissue filed September 30, 1918. Serial No. 256,355.

*To all whom it may concern:*

Be it known that I, EDWARD H. LANIER, a citizen of the United States, and resident of Cincinnati, in the county of Hamilton and State of Ohio, have invented certain new and useful Improvements in Pastry-Making Apparatus, of which the following is a specification.

My invention relates to the manufacture of that class of pastry which is in the form of cones intended for ices and other purposes, and to this end the preferred embodiment of which consists of an apparatus in which I make use of two series of molds or dies, one with cores and the other with corresponding sockets, and means whereby the cores are coated and the two parts then brought together and heated and then separated and the baked material detached, and in certain details of construction and means of operation, all as fully set forth hereinafter and as illustrated in the accompanying drawings, in which:—

Figure 1 is a side view of an apparatus embodying my invention, parts of which are illustrated diagrammatically;

Fig. 2 a plan view of the machine, parts being omitted;

Fig. 3 an enlarged longitudinal section and part elevation at one end of the apparatus;

Fig. 4 a transverse section illustrating the construction of the male and female dies or carriers;

Fig. 5 a plan of Fig. 4;

Fig. 6 a perspective view of part of the apparatus;

Fig. 7 a transverse section illustrating a somewhat different arrangement of parts from that shown in Fig. 4, together with certain detaching means;

Fig. 8 a transverse section taken substantially on the line 8—8, Fig. 7;

Fig. 9 an enlarged detail sectional view taken approximately on the line 9—9, Fig. 2 and looking in the direction of the arrow;

Fig. 10 a sectional view illustrating a detail;

Figs. 11 and 12 diagrams illustrating modifications.

Fig. 13 is an enlarged detailed vertical longitudinal section of a part of that form of the machine illustrated in Figs. 1 to 3 inclusive.

In the manufacture of hollow cones of pastry or like material I make use of a plurality of pairs of dies, or carriers, as I prefer to call them, one of which comprising a head A, Fig. 4, supports a plurality of cores 2, 2 of the shape in which it is desired to mold and bake the pastry, and the other comprising a bed B, is provided with a series of sockets $x$, each adapted to receive one of the cores of the carrier A, so that the two members constitute in fact male and female dies. Series of pairs of like carriers are operated upon together in such manner that the cores after being dipped into a batter will be brought into the sockets of the other carriers, and, while the two sets of carriers are thus together, will be heated to bake the material, after which the carriers of the two sets are successively separated and the baked material removed from the cores.

In carrying out these operations the carriers may be operated upon in different ways. For instance, as indicated by the diagram 11, the male carriers or core carriers may be guided back and forth upon a pair of tracks C, and the female or socketed carriers may be guided back and forth upon a pair of tracks E. A receptacle D may be so arranged at each end that it may be moved to and from the core carriers so as to coat the cores thereof, and the tracks of the two sets of carriers are so constructed as to bring them together after such coating is effected and maintain them in contact above a suitable heater K, consisting of a coil of steam pipes or perforated gas pipes, or of any other suitable character, and after the carriers have been sufficiently heated they are separated by the deflection of the tracks. In the construction shown in Fig. 11, the carriers after being separated are passed to the opposite end of the machine; the material is removed from the cores by hand, if necessary, and the latter are again coated and moved in a reverse direction. In the case supposed the carriers are pushed forward in contact with each other but are not necessarily connected, although preferably the several beds B are linked together in the form of a chain by links B′, and the heads A of the several units are similarly connected by links A′ to form a chain, as it were.

In the construction shown in Fig. 12 the two tracks C, E are each continuous and so formed that the core carriers will travel upon the outer track parallel to the inner track for a part of the length of the outer track, but the outer track extends beyond the inner track so that the core and socketed carriers will be separated as the core carriers are carried beyond the limits of the inner track, and will be again brought together below the inner track after the core carriers are coated. To effect such coating the outer track may be dipped or deflected downward to a slight extent above the paste or batter receptacle D so that the cores are introduced into the said receptacle for a time and then lifted out. In the illustration in Figs. 11 and 12 the tracks are supposed to be continuous grooves in suitable side rails, and the carriers of each series may be loosely in contact, or preferably, chained together.

A preferable construction for many purposes is illustrated in the remaining figures of the drawings in which the substantially horizontal portions of the tracks consist of rails C, while the curved connecting portions are formed in the shape of rotatable guides consisting of disks F with recesses *y* to receive the ends of the carriers, the series of core carriers being linked together. In this construction the rails C, C for the core carriers are arranged outside of the rails or guides E, E for the socketed carriers, as best shown in Fig. 4, and the rails E terminate at a point *z*, Fig. 3, where the core carriers are received in the notches of the disks H hereinafter more particularly referred to. To reduce friction, the different carriers are provided with anti-friction rollers 3, which run upon the rails.

As shown in Figs. 1 and 2 the series of core carriers are guided upon the substantially parallel rails C, C and by the rotatable guide disks F, F and at the desired point between the two pairs of guide disks F, F are arranged the guide disks H upon a drive shaft 4, and as a result of this construction the core carriers will be carried around the disks at the left of Fig. 1 and upon the bottom rails C, C to the disks H where they will be met by the socketed carriers, the cores being introduced into the sockets of said carriers and the two series of carriers being then carried together along the bottom rails C, and together around the disks F at the right, and together upon the upper guide rails C, E, until they are above the shaft 4 of the disks H. At this point the rails E terminate so that the socketed carriers may pass from these rails E onto the peripheries of the disks H, being received in the recesses *y*, thereof, and being thus guided to travel in a circle downward, to meet the core carriers that are traveling upon the lower rails, as before described. If desired where the carriers are not connected by links a suitable guide I may be arranged to hold the carriers B in the recesses *y* until said carriers are directly above the core carriers.

In order to properly free the cores from the sockets as the socketed carriers B on the guide disks are separated from the upper core carriers it is best to elevate the tracks C slightly at a point beyond the disks H, as best shown in Fig. 3, and in order that the cores may be properly coated with the batter I prefer to deflect or bend downward the guide tracks C between the points 5, 6, Fig. 3, adjacent to the batter receptacle D, Fig. 3, so that the cores will be caused to dip into and pass through the batter and then rise out of the same as the carriers pass onto the guide disks F. Further to insure the proper introduction of the cores into the sockets of the carriers B as the latter are brought by the disks H to contacting position, I prefer to form an upward bend in the outer tracks C at the point 7, Fig. 3.

Beyond the point where the two series of carriers are brought together I arrange suitable heating means, as for instance a series of perforated gas pipes 8, the flame of which is directed upon both sets of carriers so as to heat the same as they travel toward the right in Figs. 1 and 2, and a second series of perforated gas pipes 9 may be arranged above the first so as to heat the carriers as they pass from the guide disks F at the right toward the guide disks H, and also from the left toward the disks H.

To insure the proper molding of the material it is best to bring the two sets of carriers together under more or less pressure. This may be done in different ways, but in the construction shown I support a bearing rail J by pivoted arms 10 at each side of the machine above the lower track C between the disks F, H, in such position as to bear upon the rollers 3 of the socketed carriers then in inverted position Fig. 9 and press the latter down against the core carriers with a degree of pressure which may be regulated by means of a weight W hanging from the rail J. It will be noted that with the bar J pivoted at its two ends at 10 and the weight W located where shown, there is a variable pressure or gradual pressure exerted as the molds pass from left to right in Fig. 1, the action of the presser bar J being that of a lever whose relatively fixed fulcrum is at the right hand end 10 at the time the molds enter under the left hand end and the force applied by the weight W acts on the bar J with a leverage measured by the length from W to the right hand end 10 in figure and is applied by the leverage measured by the length of the bar J from end to end, this measure of leverage decreasing as the molds approach the location of the weight W, thus the pressure applied to force the mold elements together is not only a yielding pressure but a gradual pressure as well.

Any suitable means may be employed for detaching the baked articles after the baking is completed. Preferably in order to insure that they may remain in contact with the cores the latter have slight notches *v*, Fig. 4, in their peripheries which is sufficient to insure the desired adhesion.

As the material will thus adhere to the cores when the latter are withdrawn from the sockets of the carriers B, it becomes necessary to detach the same before the cores are again introduced into the batter, and to this end I connect each core to a sliding rod 12, sliding in the carrier A and normally carried in one direction by a spring 13 bearing upon a button or head 14 on the rod, and on the carrier so as to normally maintain the base of the cores in contact with the carrier. After the cores leave the sockets the carriers A are brought beneath a cross bar or other suitable actuating device K, whereby the rods are depressed and as thus depressed the upper portions of the cores will be brought to a plane so as to pass beneath certain horizontal fingers 15 upon standards 16, and as the rods pass from beneath the device K they are elevated by the springs 13, and the material adhering to the cores and which extends beyond the latter (in consequence of the spreading of the batter when the cores with the applied batter are seated in the sockets or cavities of the mold beds) will be caught by the fingers 15 and held so that the cores can separate therefrom, the baked material then falling into a suitable chute L, by which it may be directed into any desired receptacle. To more effectually insure the separation of the material from the cores in consequence of the adhesion afforded by the recesses *v*, I may rotate the cores by rotating the rods or stems 13. One means of doing this is illustrated in Figs. 4, 5 and 6 where the rods are shown as provided with meshing pinions 17, and the end pinion is brought at the proper time against the stationary rack 18 secured to the frame, and as the carriers travel forward the pinions are rotated, and the cores also are rotated, this operation being effected of course after the cores have left the sockets of the carriers B and insuring separation of the material from the cores inasmuch, as before described, as the batter extends between the different cores and prevents the material from turning when the cores are rotated. In some instances it is not necessary to thus rotate the cores in which case the construction may be as illustrated in Figs. 7 and 8, and in order to more effectually force away the material on the cores and on the carrier A, I may perforate the latter for the passage of pushers, shown in the form of pins 19, 19 secured to a cross-bar 20, connected with all of the pins or stems 13, and on the depression of the cross-bar 20, the pins 19 are forced through the carrier A, against the material that has been baked, in contact with the said carrier so as to force shells of baked material away from the carrier and from the cores. When the push pins 19 are employed alone to detach the cone sheet from the bar A and from the cores 2, the abutment roller K would be designed to engage said pins only without engaging the stems 13, and the bar 20 will not be used when the abutment roller K is employed. If the bar 20 is to be used with the pins 19 alone, it will have a loose or sliding connection with the stem 13, while when it is to be used to depress the stems 13, it will be firmly connected thereto.

In Fig. 10 I have shown the arrangement where both the fingers 15 and the rotating cores are employed. I have found it better to make the actuating device K in the form of a rod 22, upon which loosely rotates a corrugated sleeve 23, the opening in which is greater in diameter than the rod and which will properly engage the knobs 14 at the ends of the stems 13, and the rod 19, and insure the depression of the latter without acting too positively.

It will be evident that the carriers may be differently constructed and guided and that each carrier may have any desired number of cores or sockets, and that they may be propelled one after the other whether in contact or linked together, or independently by different means.

In order to properly grease the molds I make use of lubricating apparatus arranged between the disks H and the receptacle or pan D. As shown a shaft 30, adjacent to the disks H, carries a series of disks $30^d$ of cloth or felt or other suitable material which rotate in grease in a pan 31, and the shaft 30 is driven from the shaft 4 (see dotted lines $30^x$, Fig. 1) so as to rotate the roll and lubricate the female molds, the shaft 4 being driven from a motor M or in any other suitable manner. There is also a cylindrical grease roller 32, upon a shaft 33 driven from the shaft 30 and in contact with which the cores are successively brought so as to be properly lubricated.

The shaft 33 is perforated and communicates at the end with a grease tank X, from which a supply passes to the roller 32 in sufficient quantity to properly lubricate the cores. The roller 32 is properly made of cloth. Preferably the roller on the shaft 30 has nipples $30^y$ adapted to enter the molds.

If desired the vertical movements may be imparted to the cross bar 20 by means of side tracks 50, Fig. 12, into which rollers at the ends of the cross bar extend, said track bent as required to carry the bar 20 to and from the carrier.

Without limiting myself to the construction and arrangement shown, I claim:

1. In a pastry molding apparatus the combination of a plurality of carriers each provided with a plurality of cores, means for applying batter in a liquid condition to said cores, a plurality of carriers having sockets therein, and means for directing the carriers in courses to bring the cores into and then out of the sockets.

2. In a pastry molding apparatus the combination of a plurality of carriers each provided with a plurality of cores, means for applying batter in a liquid condition to said cores, a plurality of carriers having sockets therein, and means for directing the carriers in continuous courses to bring the cores into and then out of the sockets.

3. A pastry molding and baking machine in which are combined two series of carriers, one provided with cores and the other with corresponding sockets constructed to mold a series of independent articles, means for applying batter in a liquid condition to the cores, means for conducting the carriers to each other and moving them together, means for baking the batter between the cores and sockets, and means for thereafter separating the cores and sockets.

4. The combination in a pastry molding machine, of a connected series of carriers provided with cores, another connected series of carriers provided with sockets, means for applying batter in a liquid condition to the cores, and guides partly parallel and partly diverging, arranged to direct the carriers toward each other and to bring the cores into the sockets, maintain this relation for a defined distance, and then separate them.

5. The combination in a pastry molding machine, of a connected series of carriers provided with cores, another connected series of carriers provided with sockets, means for applying batter in a liquid condition to the cores, guides partly parallel and partly diverging, arranged to direct the carriers toward each other and to bring the cores into the sockets, maintain this relation for a defined distance and then separate them, and means for positively driving the carriers.

6. The combination in a pastry molding machine of two series of traveling carriers provided respectively with cores and sockets, a batter pan, means for causing the cores to be coated with batter from the pan, means for guiding the socketed carriers to introduce the coated cores into the sockets and conduct the two carriers together, and means for then separating the carriers.

7. The combination in a pastry molding and baking machine of two series of traveling carriers provided respectively with cores and sockets, a batter pan, means for guiding the cores over the pan and causing them to receive coatings of batter therefrom, means for guiding the socketed carriers to introduce the coated cores into the sockets and conduct the two carriers together, means for heating the carriers while together to bake the batter between the sockets and cores, and means for then separating the carriers.

8. The combination in a pastry molding and baking machine of two series of traveling carriers provided respectively with cores and sockets, a batter pan, means for causing the cores to be coated with batter from the pan, means for guiding the socketed carriers to introduce the coated cores into the sockets and conduct the two carriers together, means for baking the batter between the sockets and cores, means for then separating the carriers, and positively acting means for separating the baked material from the carriers.

9. In an apparatus for the purpose described, the combination of a receptacle for liquid batter, a plurality of core carriers connected to move successively past said receptacle, a plurality of socketed carriers, means for moving both sets of carriers and causing the cores to receive coatings of liquid batter from said receptacle and positioning each coated core in a socket, and means for baking the batter on the cores within the sockets, the cores and sockets being automatically separated after the baking operation, and the baked articles discharged therefrom.

10. In an apparatus for the purpose described, the combination of a receptacle for liquid batter, a plurality of cores adapted to be simultaneously coated by batter from said receptacle, a plurality of sockets each adapted to receive one of the coated cores, means for baking the batter on the cores within the sockets, means for moving the cores into and from the batter receptacle and engaging and disengaging the coated cores and sockets, and means for positively detaching the baked articles from the cores.

11. In an apparatus for the purpose described, the combination of a receptacle for liquid batter, a plurality of cores adapted to be simultaneously inserted into said receptacle to be coated by the batter, a plurality of sockets each adapted to receive one of the coated cores, means for baking the batter on the cores within the sockets, means for moving the cores into and from the batter receptacle and engaging and disengaging the coated cones and sockets, and means adapted to detach the baked articles from the cores by contact with said articles.

12. In an apparatus for the purpose described, the combination of a receptacle for liquid batter, a plurality of socketed carriers connected to move together, and a plurality of cores connected to move together and adapted to successively enter, move with and be separated from said carriers, the batter receptacle being positioned so that each core will be moved into and from the same during its travel while disengaged from said carrier.

13. The combination with two series of traveling carriers having cores and sockets as described, of means for greasing the cores and sockets, means for depositing batter on the cores, means for then directing the cores into the sockets, means for heating the carriers, and means for thereafter separating them.

14. The combination with the traveling core carriers and socketed carriers of a pastry molding machine, of means for applying batter in a liquid condition to the cores, means for bringing the carriers together and separating them, and means for applying pressure to force the cores into the sockets.

15. The combination with the traveling core carriers and socketed carriers of a pastry molding machine, of means for applying batter in a liquid condition to the cores, means for bringing the carriers together and separating them, and means for applying a yielding pressure to force the cores into the sockets.

16. The combination with means for conveying a series of socketed carriers in a horizontal limited path and for then deflecting the same from said path, of guides for a series of carriers provided with cores constructed to guide said core carriers parallel to the socketed carriers for a part of the course and to lift the core carriers as the socketed carriers are deflected.

17. The combination in a pastry molding and baking apparatus with a series of core carriers, of a plurality of cores for each carrier, sliding rods to which said cores are connected, and means for moving said rods vertically for the purpose set forth.

18. The combination in a pastry molding and baking apparatus with a core carrier, of cores, a rod connected with each core, springs for lifting the cores to bring their bases against the carrier, and means for sliding the rods to carry the cores from the carrier.

19. The combination in a pastry molding and baking apparatus, with a series of traveling carriers, of cores carried thereby, rods connected to the cores, and means for depressing said rods to carry the cores from the carriers for the purpose described.

20. The combination in a pastry molding and baking apparatus, with a series of traveling carriers, of cores carried thereby, rods connected to the cores, means for depressing said rods to carry the cores from the carriers, and fingers arranged between the paths of the different cores for the purpose described.

21. The combination in a pastry molding and baking apparatus with a core carrier, of cores, a rod connected with each core, springs for lifting the cores to bring their bases against the carrier, and a cross roller for depressing the rods.

22. The combination in a pastry molding and baking apparatus with a core carrier, of independent cores, a rod connected with each core, springs for lifting the cores to bring their bases against the carriers, and a stationary cross bar and loose corrugated sleeve thereon for engaging and depressing said rods.

23. The combination in a pastry molding and baking apparatus of a core carrier, a series of cores carried thereby, means for rotating said cores, and means for carrying the cores away from and to the carrier.

24. The combination in a pastry molding and baking apparatus of a core carrier, series of cores, a rod connected to each core, and pinions arranged on the rods to engage each other.

25. The combination in a pastry molding and baking apparatus with a series of traveling carriers, of cores adjustable to and from said carriers, and means for shifting said cores as the carriers travel.

26. The combination in a pastry molding and baking apparatus with a series of traveling carriers, and cores rotatable on said carriers, of means for rotating said cores as the carriers travel.

27. The combination of a series of traveling carriers and cores carried thereby, means for applying batter in a liquid condition to the cores to form hollow shells, independent pusher pins, and means opposite which the carriers travel for operating the pins to bring them against the material on the cores for the purpose set forth.

28. In a machine for making cone-shaped cakes, cup wafers and the like, a series of male and female dies between which the cones are baked in combination with means for turning the male dies after the baking operation to loosen the baked cones between the dies.

29. In a device for molding and baking hollow pastry cones, a series of conic molds, a series of conic cores adapted to enter the molds so as to mold a pastry cone between each mold and core, means for applying baking heat to said molds, and means for imparting a rotary movement to all the cores simultaneously, to loosen them from the sticking of the pastry caused by the baking heat, preparatory to withdrawing the cores from the baked pastry.

30. In a machine of the kind described, the combination of two series of mold bars having a plurality of coöperating mold parts, the mold parts of each bar of one series being mounted for rotary and axial movement in respect to the bar which carries them to thereby loosen the same from the article formed in the mold, and a baking device coöperating with the molds.

31. A machine for forming hollow pastry articles comprising in combination a series of molds, a series of cores each adapted to be received in one of the molds, means for moving the molds and cores so that each of the latter will be automatically inserted in a mold, retained therein for a time and then withdrawn, means for coating the cores with batter while separated from the molds, and means for baking the batter on the cores within the molds.

32. In a machine for forming hollow pastry articles, a traveling series of beds and heads there being a head for each bed, said heads constituting core carriers, cores on said carriers, said beds having mold-cavities to receive and be partially filled by said cores, means for supplying batter to the same, heat applying means for heating the beds and heads as said beds and heads pass over said heat applying means, and means for discharging the baked article from the beds and heads.

33. In a machine for forming hollow pastry articles, a plurality of sets of core and socket units, there being at least one core unit for each socket unit, means causing travel of said core and socket units, means for heating the units, means for supplying the units with batter at a predetermined place in their path of travel, and means for unloading the pastry articles from the units at another predetermined place in their travel.

34. In a machine for forming hollow pastry articles, core and socket carrier units, means for causing said core and socket units to travel together as one for a predetermined distance, means for loading the units with batter at a predetermined place in their path of travel, means for applying heat to the units at another place in their path of travel while said units are traveling together, means for unloading the units at a predetermined place in their path of travel.

35. In a machine for forming hollow pastry articles, a series of beds having mold-cavities, a series of heads having cores to enter and partially fill said mold-cavities, means causing travel of said beds and heads together through a predetermined path, means for supplying the beds and heads with liquid batter at intervals, means for heating said beds and heads as they are traveling together, means for dislodging the baked product from the beds and heads and delivering the same from the machine.

36. In a machine for forming hollow pastry articles, a plurality of units each consisting of a bed having mold-cavities and a head having cores to enter and partially fill said cavities, means causing travel of said units together in a definite path, means for successively supplying batter to the cores and mold-cavities of said units, means for applying heat to the molds and cores to bake the contents thereof as said units are traveling together, and means for successively disengaging the baked product from the mold-cavities of said beds.

37. In an apparatus for molding and baking hollow pastry articles, a plurality of carriers each provided with a core, a plurality of carriers each having a socket therein, means for applying batter in a liquid condition to the core, and means for directing the carriers in courses to effect a bringing together and a separation of the cores and sockets with relation to one another.

38. In an apparatus for molding and baking hollow pastry articles, a plurality of carriers each provided with a core, a plurality of carriers each having a socket therein, means for applying batter in a liquid condition to the cores, means for directing the carriers in courses to effect a bringing together and a separation of the cores and sockets with relation to one another, and means for discharging the molded product from the machine.

39. In an apparatus for molding and baking hollow pastry articles, the combination of female molds, core carriers coöperative with the female molds, means for directing the carriers and molds in courses to bring the cores into and then out of the molds, means for applying batter in liquid condition to the cores and thereby directing the same into the molds.

40. In an apparatus for molding and baking hollow pastry articles, the combination of female molds, core carriers coöperative with the female molds, means for directing the carriers and molds in courses to bring the cores into and then out of the molds, means for applying batter in liquid condition to the cores and thereby directing the same into the molds, and means for effecting a discharge of the molded product from the machine.

41. In a machine for forming hollow pastry articles, a plurality of sets of core and socket units, means causing travel of said units together, means for heating the units as they travel together, means for supplying the units with batter, and means for unloading the pastry articles from the units at another predetermined place in their travel.

42. In a machine for forming hollow pastry articles, a series of core and socket units, means causing travel of the same together, means for applying heat to the core and socket units as said units travel together, means for loading the units with liquid batter, means for unloading the baked product from the units, and means for collecting the product and delivering the same from the machine.

43. A pastry molding and baking machine in which are combined two sets of carriers, one provided with cores and the other with corresponding sockets, means for applying batter in a liquid condition to the cores, means for effecting relative motion between the carriers to bring the cores and sockets into the molding relationship, means for applying heat to the sockets and cores to bake the batter between the cores and sockets, and means for thereafter separating the cores and sockets.

44. A pastry molding and baking machine in which are combined two sets of carriers, one provided with cores and the other with corresponding sockets, means for applying batter in a liquid condition to the cores, means for effecting relative motion between the carriers to bring the cores and sockets into the molding relationship, means for applying heat to the sockets and cores to bake the batter between the cores and sockets, and means for effecting the removal of the product from the sockets and cores, to discharge the same.

45. The combination, in a pastry molding machine of a core carrier, a core supported thereby, a female mold having a socket to receive the core, a batter holder, means for effecting relative motion between the batter holder and core to cause the core to be coated with batter from the holder, means for bringing the female mold and core into molding relationship, means for applying heat to bake the batter, and means for discharging the molded product from the machine.

46. The combination with the core carriers and the female mold carriers, the latter having sockets to receive the cores, of means for applying batter in a liquid condition to the cores, means for bringing the carriers together and then separating them, means for applying heat to bake the product, and means for delivering the product from the machine.

47. The combination with the core carriers and the socketed female mold carriers of a pastry molding machine, of means for applying batter in a liquid condition to the cores, means for bringing the carriers together and separating them, means for applying pressure to force the cores into the sockets.

48. The combination with traveling core carriers and socketed carriers of a pastry molding machine, means for supplying batter to the same, means for bringing the carriers together and then separating them, and means for applying gradual pressure to force the cores into the sockets.

49. The combination with traveling core carriers and socketed carriers of a pastry molding machine, means for supplying batter to the same, means for bringing the carriers together and then separating them, means for applying gradual pressure to force the cores into the sockets, and means for applying heat to bake the product.

50. The combination with the male and female mold elements of a pastry molding and baking machine of the class described, of means for supplying batter to said elements, means for applying heat to said elements, and means for yieldably applying pressure to force the male elements into the female elements.

51. The combination with traveling core carriers and socketed carriers of a pastry molding machine, means for supplying batter to the same, means for bringing the carriers together and then separating the same, means for applying heat to the cores and sockets to bake the product, means for applying pressure to the core carriers to force the cores into the sockets, and means for effecting the removal of the product from the sockets and cores and discharging the same from the machine.

52. The combination with traveling core carriers and socketed carriers of a pastry molding machine, means for supplying batter to the same, means for bringing the carriers together and then separating them, means for applying heat to the cores and sockets to bake the product, means for applying yieldable pressure to force the cores into the sockets and allow escape of steam during the commencement of the baking operation and means for discharging the molded product from the machine.

53. The combination with the male and female mold elements of a pastry molding and baking machine of the class described, of means for supplying batter to said elements, means for applying heat to said elements, means for yieldably applying pressure to force the male elements into the female elements, and means for discharging the baked product from the machine.

54. In a machine of the class described, a series of male and female baking dies between which the articles are formed and baked, in combination with means for turning the male dies to loosen the baked cones.

55. In combination with a plurality of heated baking molds and cores, means for supplying batter to the same, and means for separating the cores from the molds after the articles have been substantially fully baked and effecting a detachment of the finished articles from the molds and cores and discharging said articles from the machine.

56. In a machine of the class described, the combination with the traveling series of molds and cores; of means for first slightly separating the core from the mold by movement in the general direction of the axis of the core and then tilting the core while projected into the mold.

57. In a machine for molding and baking hollow cup-pastry wherein is provided male and female mold elements and means for separating the male element from and restoring it to the female element; a device for pressing the male and female elements during the initial part only of the baking stage.

58. In a machine for molding and baking hollow cup-pastry wherein is provided male and female mold elements and means for separating the male element from and restoring it to the female element; a device for applying yielding pressure to force the male and female elements together during the initial part of the baking stage.

59. In a machine for molding and baking hollow cup-pastry wherein is provided male and female mold elements and means for separating the male element from and restoring it to the female element; a presser lever bar for applying yielding pressure to force the male and female elements together during a part of the baking stage, and means whereby the degree of pressure may be regulated as required.

60. In a machine for forming hollow pastry articles, a traveling series of beds having mold cavities and a series of heads having cores to enter and partially fill said mold cavities, means causing travel of said beds and heads through a predetermined path, means for supplying the beds and heads with liquid batter at intervals, means for heating said beds and heads, means for causing a separation to occur between said heads and beds at a predetermined place and including means for tilting the heads as they separate from the beds.

61. In a machine for molding and baking hollow pastry articles, the combination with a traveling series of molds and cores, of means for effecting a separation of the cores and molds for charging and unloading purposes, means for supplying batter, means for applying yielding pressure to the cores after the cores and molds have been brought together, whereby to squeeze the batter in the molds.

62. In a machine of the class described, the combination with the mold and core; of means coöperative with the core for disengaging the article from the mold and, discharging it from the machine.

63. In a machine for molding and baking hollow cup-pastry wherein is provided male and female elements and means for separating the male element from and restoring it to the female element; a device for applying a gradual yielding pressure to force the male and female elements together during a part of the baking stage.

64. In a machine for molding and baking hollow cup-pastry wherein is provided male and female elements and means for separating the male element from and restoring it to the female element; a device for applying a gradual pressure to force the male and female elements together during a part of the baking stage.

65. In a machine for molding and baking hollow cup pastry wherein is provided male and female mold elements and means for separating the male element from and restoring it to the female element; a device distinct from said last named means for effecting the final pressure of the male element into the female element during the initial part of the baking stage and after a predetermined interval of time has elapsed after the insertion of the male element into the female element.

66. In a machine for forming hollow pastry articles, an endless series of bed units having mold cavities, a series of head units constituting core carriers and having cores for entering said mold cavities, there being at least one head unit for each bed unit, heat applying instrumentalities past which said bed and head units travel, means for causing travel of said bed and head units, means for supplying batter to said units, and means for discharging the baked article from said units and delivering the same from the machine.

67. In a machine for forming hollow pastry articles, a series of bed units having mold cavities, head units having cores to enter said mold, there being at least one head unit for each bed unit, heat applying instrumentalities past which said units are caused to travel, means for causing said bed and head units to travel past said heat applying instrumentalities, means for supplying batter to said units, means for restraining said head units from movement away from said bed units during the initial part of the baking operation while allowing for the escape of steam, and means for discharging the baked article from said units.

68. In a machine for forming hollow pastry articles, a series of bed units having mold cavities, a series of head units having cores to enter and partially fill said mold cavities, means causing said units to travel together through a predetermined path during the baking interval, means for supplying the beds and heads with liquid batter at intervals, heat applying instrumentalities for said beds and heads during the baking period, and means coöperative with the core for dislodging the baked product from the beds and heads and delivering the same from the machine.

69. In a machine for forming hollow pastry articles, forming devices which comprise an endless series of beds having mold cavities and heads having molding cores to enter and partially fill said cavities, means causing said beds and heads to travel in orbits and together throughout the baking period, means applying heat to said forming devices during the baking period only, means for separating said heads and beds after passing the heat applying means, means for discharging the product from the forming devices and from the machine after the forming devices have past said heat applying means, and means for loading said forming devices with batter before the forming devices come under the influence of the heat applying means.

70. In a machine for molding and baking cup pastry wherein is provided a traveling series of male and female elements, and means for separating the male element from and restoring it to the female element, a pressure bar for engaging one of said elements and applying a gradual pressure to force said male and female elements together, with the cores in the sockets.

EDWARD H. LANIER.